US011239030B2

(12) United States Patent
Hashimoto et al.

(10) Patent No.: US 11,239,030 B2
(45) Date of Patent: Feb. 1, 2022

(54) ELECTRONIC COMPONENT

(71) Applicant: Murata Manufacturing Co., Ltd., Nagaokakyo (JP)

(72) Inventors: Hideyuki Hashimoto, Nagaokakyo (JP); Daiki Fukunaga, Nagaokakyo (JP); Takayuki Yao, Nagaokakyo (JP); Takehisa Sasabayashi, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 138 days.

(21) Appl. No.: 16/566,994

(22) Filed: Sep. 11, 2019

(65) Prior Publication Data

US 2020/0105468 A1   Apr. 2, 2020

(30) Foreign Application Priority Data

Sep. 27, 2018   (JP) .............................. JP2018-182218

(51) Int. Cl.
| | |
|---|---|
| *H01G 4/12* | (2006.01) |
| *H01G 4/30* | (2006.01) |
| *H01G 4/10* | (2006.01) |
| *H01G 4/005* | (2006.01) |

(52) U.S. Cl.
CPC ........... *H01G 4/1218* (2013.01); *H01G 4/005* (2013.01); *H01G 4/10* (2013.01); *H01G 4/30* (2013.01)

(58) Field of Classification Search
CPC .......... H01G 4/12; H01G 4/30; H01G 4/1218; H01G 4/10; H01G 4/005; H01G 4/008; H01G 4/1209

USPC ..... 361/321.1, 321.2, 301.4, 303, 321.5, 311
See application file for complete search history.

(56) References Cited

U.S. PATENT DOCUMENTS

| | | | | |
|---|---|---|---|---|
| 6,278,602 | B1 * | 8/2001 | Haratani ................ | H01G 4/005 361/303 |
| 2011/0205686 | A1 * | 8/2011 | Yamaguchi .......... | H01G 4/1227 361/321.4 |
| 2012/0069489 | A1 * | 3/2012 | Takeuchi ............. | H01G 4/2325 361/321.1 |

(Continued)

FOREIGN PATENT DOCUMENTS

| | | |
|---|---|---|
| JP | 2016-001721 A | 1/2016 |
| JP | 2017-028013 A | 2/2017 |
| JP | 2017-178684 A | 10/2017 |

*Primary Examiner* — Arun Ramaswamy
(74) *Attorney, Agent, or Firm* — Keating & Bennett, LLP (57) ABSTRACT

An electronic component includes a laminate including internal electrodes alternately laminated in a lamination direction with dielectric layers interposed therebetween. The laminate includes main surfaces opposite to each other in the lamination direction, side surfaces opposite to each other in a width direction, and end surfaces opposite to each other in a length direction, and external electrodes provided on surfaces of the laminate and electrically connected to the internal electrodes. Each of the dielectric layers includes Ti and Mg. When a cross section including the length direction and the width direction of the laminate is viewed from the lamination direction, side margin portions in which the internal electrodes do not exist each include a dielectric including Ti and Mg with a molar ratio in each of the side margin portions smaller than a molar ratio of Mg to Ti included in each of the dielectric layers.

20 Claims, 7 Drawing Sheets

(56) References Cited

U.S. PATENT DOCUMENTS

| | | | |
|---|---|---|---|
| 2015/0318109 A1* | 11/2015 | Lee | H01G 4/385 |
| | | | 361/301.4 |
| 2015/0340155 A1 | 11/2015 | Fukunaga et al. | |
| 2017/0018363 A1 | 1/2017 | Tanaka et al. | |
| 2017/0040111 A1* | 2/2017 | Kim | H01G 4/30 |
| 2017/0287636 A1 | 10/2017 | Sakurai et al. | |
| 2018/0061575 A1* | 3/2018 | Mizuno | H01G 4/008 |

* cited by examiner

ELECTRONIC COMPONENT

CROSS REFERENCE TO RELATED APPLICATIONS

This application claims the benefit of priority to Japanese Patent Application No. 2018-182218 filed on Sep. 27, 2018. The entire contents of this application are hereby incorporated herein by reference.

BACKGROUND OF THE INVENTION

1. Field of the Invention

The present invention relates to an electronic component.

2. Description of the Related Art

Conventionally, there is known an electronic component including a laminate in which a plurality of internal electrodes and dielectric layers are alternately laminated, and external electrodes electrically connected to the internal electrodes and formed on surfaces of the laminate.

As one of such electronic components, JP 2017-178684 A describes a multilayer ceramic capacitor in which a pair of external electrodes are provided on both end surfaces of a laminate in which a plurality of internal electrodes and dielectric layers are alternately laminated.

Although there is a strong demand for reduction in size of electronic components such as the multilayer ceramic capacitor, when the electronic component is reduced in size, it is necessary to reduce thicknesses of the dielectric layers, and the insulation resistance between the internal electrodes is degraded, so that the reliability may be reduced.

SUMMARY OF THE INVENTION

Preferred embodiments of the present invention provide electronic components, each of which improve reliability of the insulation resistance.

According to a preferred embodiment of the present invention, an electronic component includes a laminate in which a plurality of internal electrodes are alternately laminated in a lamination direction with dielectric layers interposed between the internal electrodes, the laminate including a first main surface and a second main surface opposite to each other in the lamination direction; a first side surface and a second side surface opposite to each other in a width direction perpendicular or substantially perpendicular to the lamination direction; and a first end surface and a second end surface opposite to each other in a length direction perpendicular or substantially perpendicular to the lamination direction and the width direction; and external electrodes provided on surfaces of the laminate and electrically connected to the internal electrodes, in which each of the dielectric layers includes Ti and Mg; when a cross section including the length direction and the width direction of the laminate is viewed from the lamination direction, side margin portions each being a region in which the plurality of the internal electrodes do not exist are each made of a dielectric including Ti and Mg; and a molar ratio of Mg to Ti included in the side margin portions is smaller than a molar ratio of Mg to Ti included in the dielectric layers.

The molar ratio of Mg to Ti included in the side margin portions may be about 0.02 or more and about 0.8 or less, and the molar ratio of Mg to Ti included in the dielectric layers may be about 0.04 or more and about 2.3 or less.

Each of the side margin portions may include a plurality of side margin layers laminated in the width direction, and a molar ratio of Mg to Ti included in the side margin layer located on an innermost side in the width direction may be smaller than a molar ratio of Mg to Ti included in the side margin layer located on an outermost side in the width direction.

The internal electrodes may have a segregated portion in which Mg is segregated in a range of about 10 μm or less inward from an end portion in the width direction.

An average thickness of the end portion in the width direction of each of the plurality of internal electrodes may be smaller than an average thickness of a central portion in the width direction of each of the plurality of internal electrodes.

According to the electronic components of preferred embodiments of the present invention, the reliability of the insulation resistance is improved.

The above and other elements, features, steps, characteristics and advantages of the present invention will become more apparent from the following detailed description of the preferred embodiments with reference to the attached drawings.

BRIEF DESCRIPTION OF THE DRAWINGS

FIGS. 6A and 6B are views for explaining an example of a method of manufacturing a multilayer ceramic capacitor according to a preferred embodiment of the present invention, in which

DETAILED DESCRIPTION OF THE PREFERRED EMBODIMENTS

Hereinafter, the features of the present invention will be specifically described by describing preferred embodiments of the present invention. In the following, a multilayer ceramic capacitor is described as an example of an electronic component of the present invention. However, the electronic component is not limited to the multilayer ceramic capacitor, and may be another electronic component such as an inductor or an LC filter.

Figure 1:
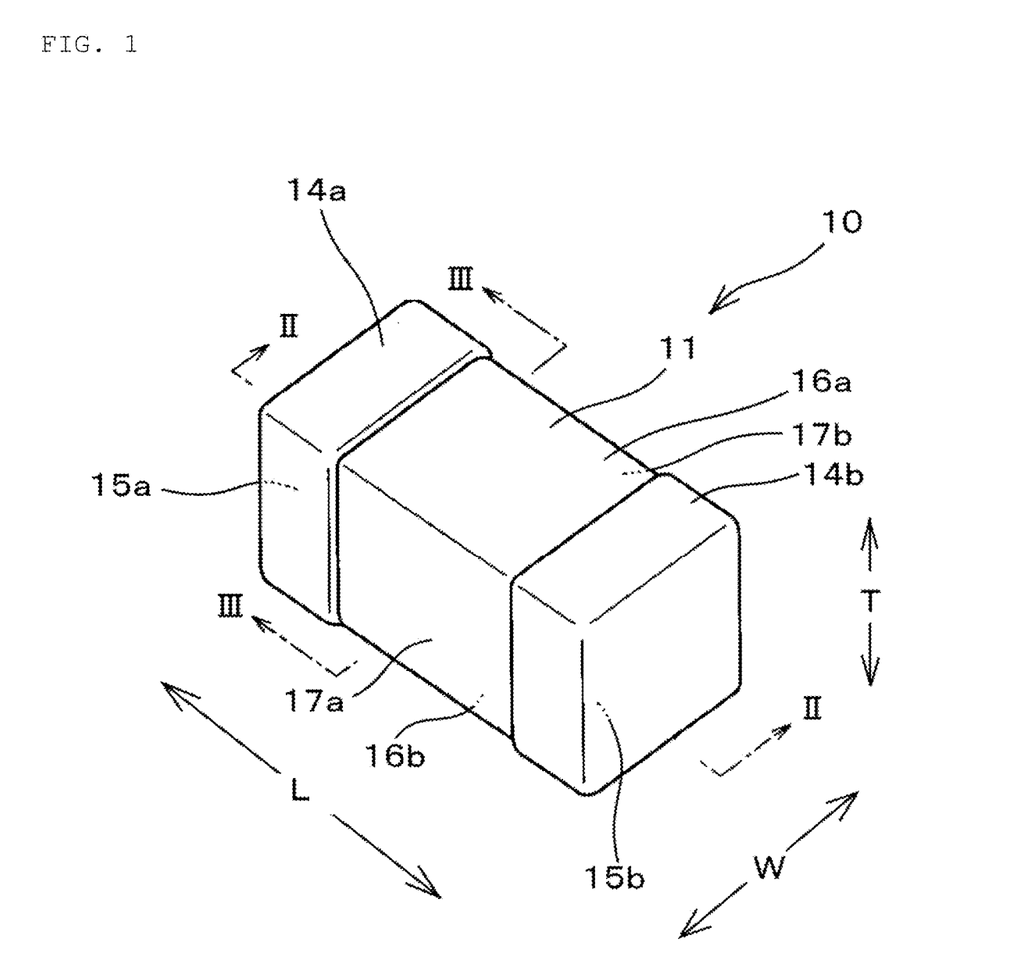
FIG. 1 is a perspective view for illustrating an example of a multilayer ceramic capacitor according to a preferred embodiment of the present invention.
Figure 2:
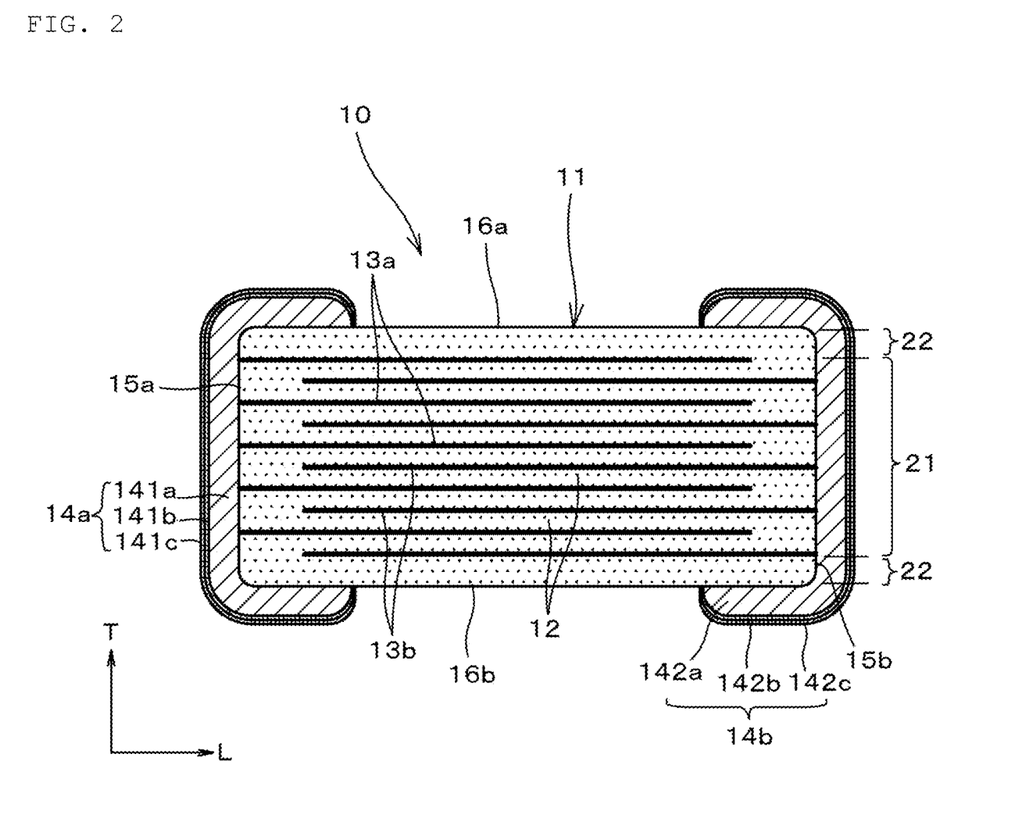
FIG. 2 is a cross-sectional view of a multilayer ceramic capacitor illustrated in FIG. 1 along the line II-II.
Figure 3:
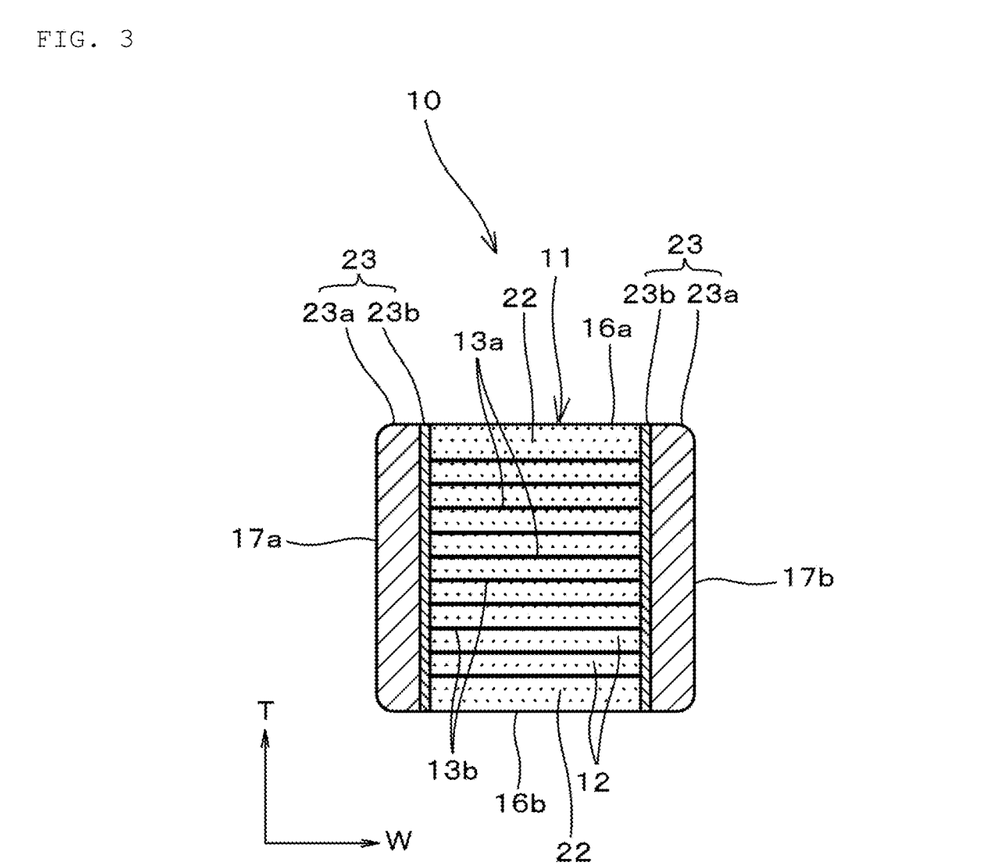
FIG. 3 is a cross-sectional view of the multilayer ceramic capacitor illustrated in FIG. 1 taken along the line III-III.

FIG. 1 is a perspective view for illustrating an example of a multilayer ceramic capacitor 10 according to a preferred embodiment. FIG. 2 is a cross-sectional view of the multilayer ceramic capacitor 10 illustrated in FIG. 1 along the line II-II. FIG. 3 is a cross-sectional view of the multilayer ceramic capacitor 10 illustrated in FIG. 1 taken along the line III-III.

As illustrated in FIGS. 1 to 3, the multilayer ceramic capacitor 10 preferably has a rectangular or substantially rectangular parallelepiped shape as a whole, and includes a laminate 11 and external electrodes 14a and 14b being a pair of external electrodes 14. The pair of external electrodes 14 are arranged to face each other as illustrated in FIG. 1.

Here, the direction in which the pair of external electrodes 14 face each other is defined as a length direction L of the multilayer ceramic capacitor 10, the lamination direction of internal electrodes 13a and 13b being internal electrodes 13 described later is defined as a lamination direction T, and the direction perpendicular or substantially perpendicular to any of the length direction L and the lamination direction T is defined as a width direction W.

The size of the multilayer ceramic capacitor 10 is, for example, about 0.2 mm to about 3.2 mm (inclusive) in dimension in the length direction L, about 0.1 mm to about 1.6 mm (inclusive) in dimension in the width direction W, and about 0.1 mm to about 1.6 mm (inclusive) in dimension in the lamination direction T.

The laminate 11 includes a first end surface 15a and a second end surface 15b opposite to each other in the length direction L, a first main surface 16a and a second main surface 16b opposite to each other in the lamination direction T, and a first side surface 17a and second side surface 17b opposite to each other in the width direction W.

The first end surface 15a and the second end surface 15b extend along the width direction W and the lamination direction T. The first main surface 16a and the second main surface 16b extend along the length direction L and the width direction W. The first side surface 17a and the second side surface 17b extend along the length direction L and the lamination direction T.

The laminate 11 may include rounded corner portions and ridge line portions. Here, the corner portion is a portion at which the three surfaces of the laminate 11 intersect, and the ridge line portion is a portion at which the two surfaces of the laminate 11 intersect.

As illustrated in FIGS. 2 and 3, the laminate 11 includes an inner layer portion 21, outer layer portions 22, and side margin portions 23.

The inner layer portion 21 includes dielectric layers 12, first internal electrodes 13a, and second internal electrodes 13b. The dielectric layer 12 is sandwiched between the first internal electrode 13a and the second internal electrode 13b. The inner layer portion 21 is configured by alternately laminating the plurality of first internal electrodes 13a and the plurality of second internal electrodes 13b with the dielectric layers 12 interposed therebetween.

The dielectric layer 12 includes a perovskite type compound including Ba and Ti as main components, and is made of dielectric ceramic particles having a perovskite structure. Si and Mg are included as main components thereof. Si and Mg function as sintering aids during firing. The dielectric layers 12 may also include rare earth elements such as Dy, Y and Ho. The thickness of the dielectric layers 12 is, for example, about 0.3 μm or more and about 0.8 μm or less.

The first internal electrode 13a and the second internal electrode 13b face each other in the lamination direction T with the dielectric layer 12 interposed therebetween. Capacitance is generated in a region where the first internal electrode 13a and the second internal electrode 13b face each other with the dielectric layer 12 interposed therebetween.

The dielectric layer 12 extends in the width direction W and the length direction L. The first internal electrode 13a extends flatly along the dielectric layer 12 and is drawn to the first end surface 15a of the laminate 11. The second internal electrode 13b extends flatly along the dielectric layer 12 and is drawn to the second end surface 15b of the laminate 11.

The first internal electrode 13a and the second internal electrode 13b include, for example, Ni. The first internal electrode 13a and the second internal electrode 13b may include, in addition to Ni, metal such as Cu, Ag, Pd, an Ag—Pd alloy, or Au. Further, it is preferable that the first internal electrode 13a and the second internal electrode 13b include the same material as dielectric ceramic included in the dielectric layer 12 as a co-material.

The first internal electrode 13a and the second internal electrode 13b include a segregated portion in which Mg is segregated in a range of about 10 μm or less inward from the end portion in the width direction W. That is, in the first internal electrode 13a and the second internal electrode 13b, a range of about 10 μm or less from the end portion in the width direction W in contact with the side margin portion 23 described later is the segregation portion of Mg.

The amount of Mg included in the first internal electrode 13a and the second internal electrode 13b can be determined, for example, using a wavelength dispersive X-ray analyzer (WDX) after polishing the multilayer ceramic capacitor 10 to expose the first internal electrodes 13a and the second internal electrodes 13b.

In addition, Si is also segregated at the end surface in the width direction W of the first internal electrode 13a and the second internal electrode 13b.

The number of laminated internal electrodes 13 including the first internal electrodes 13a and the second internal electrodes 13b is, for example, 10 or more and 500 or less.

Figure 4:
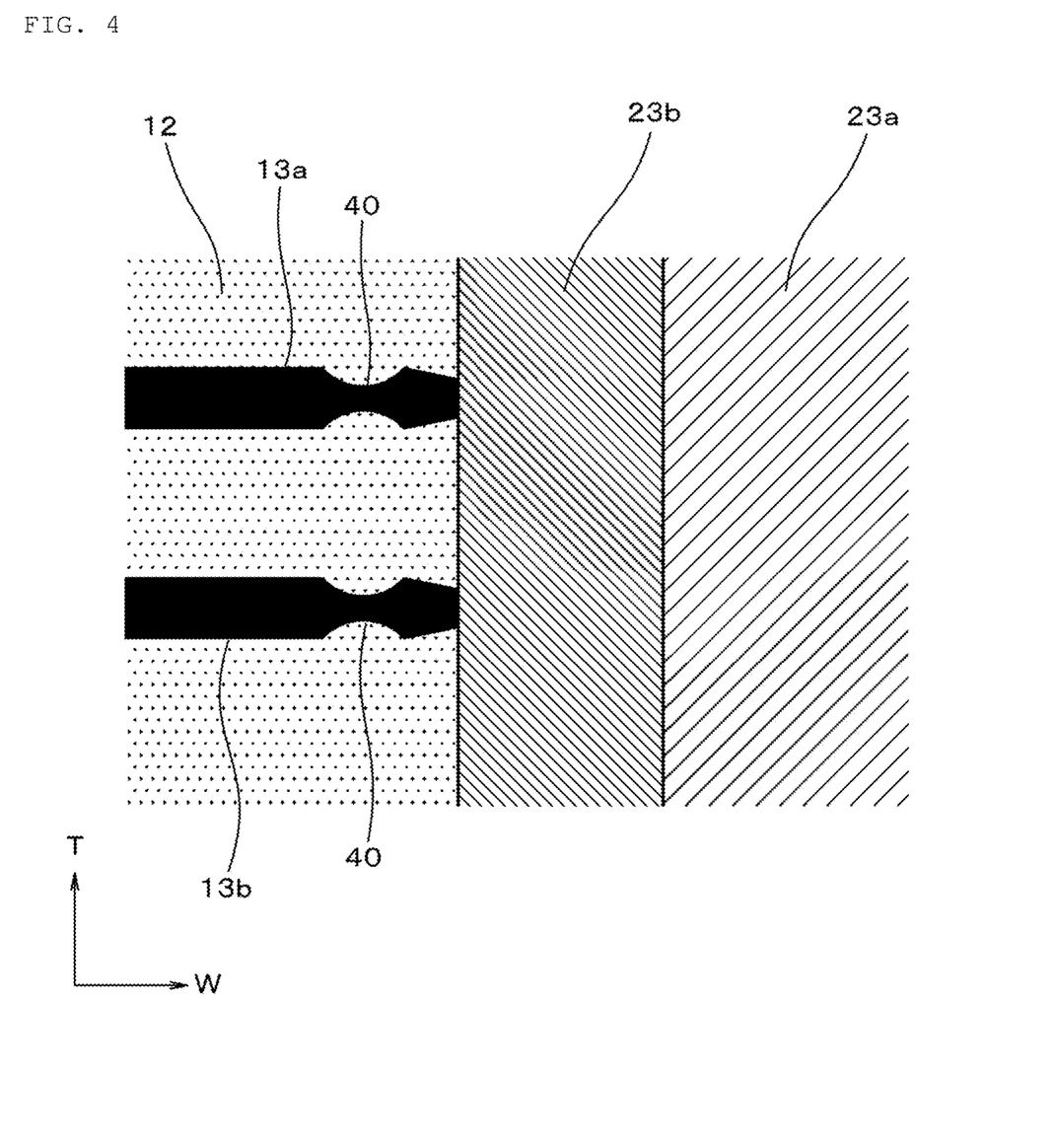
FIG. 4 is an enlarged view of end portions in the width direction of internal electrodes.

FIG. 4 is an enlarged view of end portions in the width direction W of the internal electrodes 13. As illustrated in FIG. 4, the thickness of the end portion in the width direction W of the internal electrode 13 is thinner than the thickness of the other portion of the internal electrode 13, more specifically, the central portion in the width direction W of the internal electrode 13. That is, the average thickness of the end portions in the width direction W of the plurality of internal electrodes 13 is thinner than the average thickness of the central portion in the width direction W of the plurality of internal electrodes 13. It is considered that, because the dielectric layer 12 has a smaller amount of included Mg in the end portion in the width direction W in contact with the side margin portion 23 described later than the central portion, the end portion has a smaller amount of shrinkage than the central portion due to firing at the time of manufacture.

The thickness of the central portion in the width direction W of the plurality of internal electrodes 13 is, for example, about 0.8 μm, and the thickness of the end portion in the width direction W is, for example, about 0.55 μm. Further, as illustrated in FIG. 4, it is preferable to provide a thin portion 40 thinner than the thickness of the end portion within about 10 μm from the end portion in the width direction W. The thickness of the thin portion 40 is, for example, about 0.4 μm, and the provision of the thin portion 40 hardly causes peeling between the internal electrodes.

As described above, the plurality of internal electrodes 13 are thinner in the end portion than the central portion in the width direction W. With this, the occurrence of short circuit at the end portion of the internal electrode 13 which is likely to cause short circuit can be suppressed.

In this preferred embodiment, when the cross section including the width direction W and the lamination direction T of the multilayer ceramic capacitor 10 is viewed from the length direction L, as illustrated in FIG. 3, the positions of the end portions of the internal electrodes 13 are aligned in the lamination direction. That is, the dimensions in the width direction W of the plurality of internal electrodes 13 are substantially the same.

Figure 5:
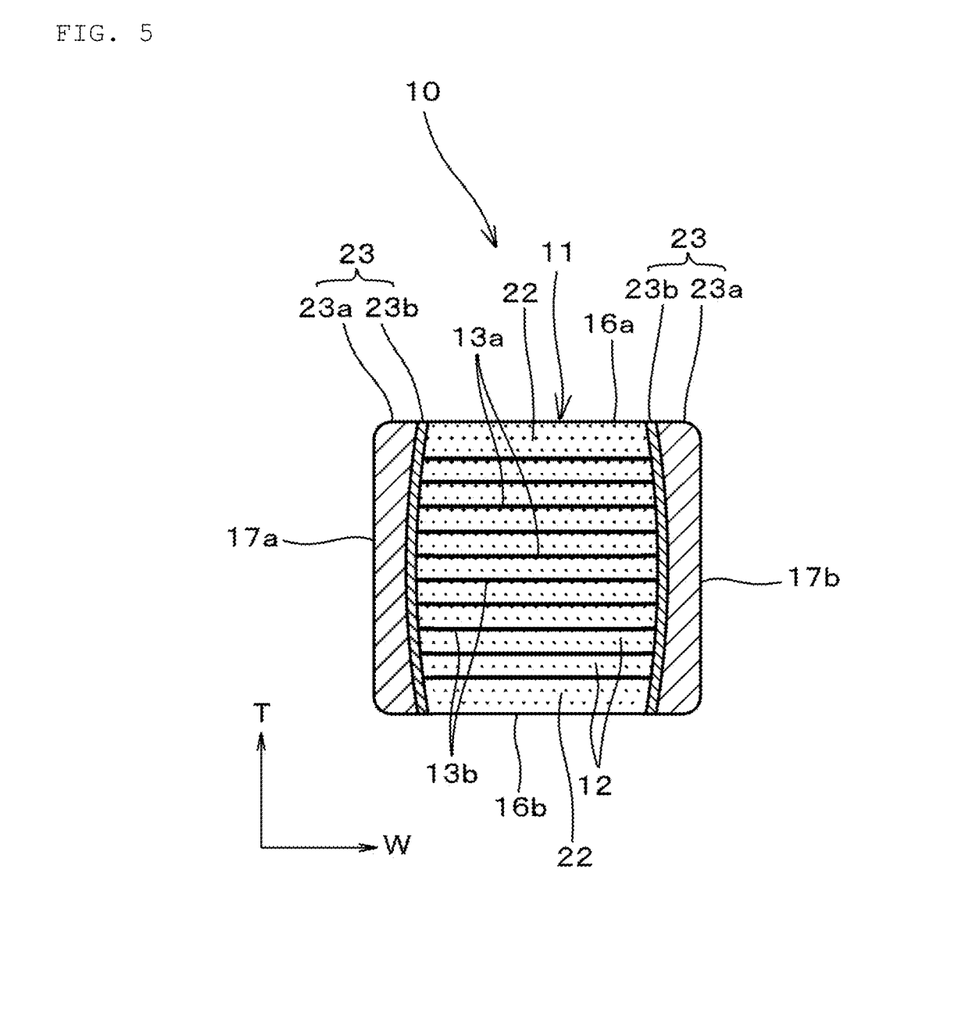
FIG. 5 is a cross-sectional view of a multilayer ceramic capacitor with end portions in a width direction of a plurality of internal electrodes including a structure of a positional relationship in which a central portion in a lamination direction bulges outward compared to outer sides in the lamination direction.

However, as illustrated in FIG. 5, the positions of the end portions in the width direction W of the plurality of internal electrodes 13 may have such a positional relationship that the central portion in the lamination direction T bulges outward compared to the outer sides in the lamination direction T. In other words, the dimensions in the width direction W of the internal electrodes 13 located at the central portion in the lamination direction T are larger than the dimensions in the width direction W of the internal electrodes 13 located on the outer side in the lamination direction T.

The outer layer portions 22 are provided on both outer sides in the lamination direction T of the inner layer portion 21. That is, the inner layer portion 21 is sandwiched between the two outer layer portions 22 provided on both the outer sides in the lamination direction T. The outer layer portions 22 each correspond to a region in which none of the first internal electrode 13a and the second internal electrode 13b exist except for the side margin portions 23 described later when a freely-selected cross section including the lamination direction T and the width direction W of the laminate 11 is viewed from the length direction L.

The outer layer portion 22 is made of, for example, a dielectric made of the same material as the dielectric layer 12. The dimension in the lamination direction T of the outer layer portion 22 is, for example, about 5 μm or more and about 100 μm or less.

The side margin portions 23 each correspond to a region in which none of the first internal electrode 13a and the second internal electrode 13b exist when a freely-selected cross section including the length direction L and the width direction W of the laminate 11 is viewed from the lamination direction T. As illustrated in FIG. 3, the side margin portions 23 are located on both outer sides in the width direction W. That is, the two side margin portions 23 sandwich the inner layer portion 21 and the outer layer portions 22 from both the outer sides in the width direction W.

In this preferred embodiment, the side margin portion 23 includes a plurality of side margin layers laminated in the width direction W. Specifically, the side margin portion 23 includes an outer side margin layer 23a and an inner side margin layer 23b. The outer side margin layers 23a are located on the first side surface 17a side and the second side surface 17b side of the laminate 11. Further, the inner side margin layers 23b are located on the inner layer portion 21 side.

It should be noted that the side margin portion 23 includes the plurality of side margin layers 23a and 23b, and the boundary can be easily confirmed by observation by using an optical microscope due to the difference in the sinterability between the outer side margin layer 23a and the inner side margin layer 23b. That is, the boundary exists between the outer side margin layer 23a and the inner side margin layer 23b. There may be a plurality of boundaries.

The dimension in the width direction W of the side margin portion 23 is, for example, about 5 μm or more and about 30 μm or less. In this preferred embodiment, the dimension in the width direction W of the outer side margin layer 23a is larger than the dimension in the width direction W of the inner side margin layer 23b.

The dimension in the width direction W of the side margin portion 23 means an average dimension obtained by measuring dimensions of the side margin portion 23 at a plurality of locations along the lamination direction T and calculating an average based on the measurement values at the plurality of locations. The measuring method of the dimension in the width direction W of the side margin portion 23 is as follows.

First, a surface including the width direction W and the lamination direction T of the multilayer ceramic capacitor (hereinafter, referred to as "WT cross section") is exposed. Next, an image is taken with an optical microscope so that the end portions in the width direction W of the first internal electrodes 13a and the second internal electrodes 13b in the WT cross section and any one of the two side margin portions 23 located on both the outer sides in the width direction W are captured within the same field of view. There are three imaging locations of an upper portion, a central portion, and a lower portion in the lamination direction T. Then, in the upper portion, the central portion, and the lower portion, a plurality of line segments parallel to the width direction W are drawn from the end portions in the width direction W of the first internal electrodes 13a and the second internal electrodes 13b toward the first side surface 17a or the second side surface 17b, and the lengths of the line segments are measured. The average value of the lengths of the line segments measured in this manner at each of the upper portion, the central portion, and the lower portion is calculated. Further, the average values are further averaged to obtain a dimension in the width direction W of the side margin portion 23.

The side margin portion 23 includes, for example, a dielectric made of a dielectric ceramic material including a perovskite structure which includes $BaTiO_3$ or the like as a main component. Si and Mg are included as additives as main components thereof. Si and Mg function as sintering aids during firing.

The outer side margin layer 23a includes a larger content of Si than the inner side margin layer 23b. That is, the molar ratio of Si/Ti of the outer side margin layer 23a is higher than the molar ratio of Si/Ti of the inner side margin layer 23b. Since Si functions as a sintering aid, the outer side margin layer 23a obtained by firing in manufacturing the multilayer ceramic capacitor 10 has a denser structure than the inner side margin layer 23b. With this, the strength of the side margin portion 23 is able to be improved, so that the side margin portion 23 is unlikely to be cracked or chipped, and is thus able to prevent entry of moisture into the inside.

In the multilayer ceramic capacitor 10 in this preferred embodiment, the dielectric layer 12 and the side margin portion 23 each include Ti and Mg. The molar ratio of Mg to Ti included in the side margin portion 23 is smaller than the molar ratio of Mg to Ti included in the dielectric layer 12. With such a configuration, the reliability of the insulation resistance of the multilayer ceramic capacitor 10 is able to be improved.

The molar ratio of Mg to Ti included in the side margin portion 23 is, for example, about 0.02 or more and about 0.8 or less. Further, the molar ratio of Mg to Ti included in the dielectric layer 12 is, for example, about 0.04 or more and about 2.3 or less.

When the side margin portion 23 includes the plurality of side margin layers laminated in the width direction W as in this preferred embodiment, it is only necessary that the molar ratio of Mg to Ti included in the side margin layer closest to the inner layer portion 21 among the plurality of side margin layers is smaller than the molar ratio of Mg to Ti included in the dielectric layer 12.

The molar ratio of Mg to Ti included in the inner side margin layer 23b may be different from or the same as the molar ratio of Mg to Ti included in the outer side margin layer 23a. In this preferred embodiment, the molar ratio of Mg to Ti included in the inner side margin layer 23b close to the inner layer portion 21 is smaller than the molar ratio of Mg to Ti included in the outer side margin layer 23a.

A first external electrode 14a is provided on the entire first end surface 15a of the laminate 11, and wraps around the first main surface 16a, the second main surface 16b, the first side surface 17a, and the second side surface 17b, from the first end surface 15a. The first external electrode 14a is electrically connected to the first internal electrodes 13a.

A second external electrode 14b is provided on the entire second end surface 15b of the laminate 11, and wraps around the first main surface 16a, the second main surface 16b, the first side surface 17a, and the second side surface 17b, from the second end surface 15b. The second external electrode 14b is electrically connected to the second internal electrodes 13b.

In this preferred embodiment, as illustrated in FIG. 2, the first external electrode 14a has a three-layer structure including a first base electrode layer 141a, a first lower plating layer 142a provided on the surface of the first base electrode layer 141a, and a first upper plating layer 143a provided on the surface of the first lower plating layer 142a.

The first base electrode layer 141a covers the entire first end surface 15a of the laminate 11, and is provided so as to cover a portion of each of the first side surface 17a and the second side surface 17b and a portion of each of the first main surface 16a and the second main surface 16b, from the portion covering the first end surface 15a.

Further, in this preferred embodiment, as illustrated in FIG. 2, the second external electrode 14b has a three-layer structure including a second base electrode layer 141b, a second lower plating layer 142b provided on the surface of the second base electrode layer 141b, and a second upper plating layer 143b formed on the surface of the second lower plating layer 142b.

The second base electrode layer 141b covers the entire second end surface 15b of the laminate 11, and is provided so as to cover a portion of each of the first side surface 17a and the second side surface 17b and a portion of each of the first main surface 16a and the second main surface 16b, from the portion covering the second end surface 15b.

The first base electrode layer 141a and the second base electrode layer 141b include, for example, metal such as Ni, Cu, Ag, Pd, an Ag—Pd alloy, or Au. The first base electrode layer 141a and the second base electrode layer 141b may be a plurality of layers.

The first base electrode layer 141a and the second base electrode layer 141b may be formed by so-called co-firing in which the first base electrode layer 141a and the second base electrode layer 141b are fired with the first internal electrodes 13a and the second internal electrodes 13b at the same time, or may be formed by so-called post-fire in which conductive paste is applied on the laminate 11 and the first base electrode layer 141a and the second base electrode layer 141b are fired. In the case of formation by co-firing, for example, the first internal electrode 13a and the second internal electrode 13b may include Ni, and the first base electrode layer 141a and the second base electrode layer 141b may also include Ni. In the case of co-firing, it is preferable that the external electrode 14 includes a dielectric material as a co-material, and that the external electrode 14 include three or more times the amount of the co-material included in the internal electrode 13. The first base electrode layer 141a and the second base electrode layer 141b may be formed by direct plating, or may be formed by curing a resin layer including conductive particles and thermosetting resin.

It is preferable that the first lower plating layer 142a and the second lower plating layer 142b include Ni in order to prevent solder breakage. However, the first lower plating layer 142a and the second lower plating layer 142b may include, for example, metal such as Cu, Ag, Pd, an Ag—Pd alloy, or Au in addition to Ni.

It is preferable that the first upper plating layer 143a and the second upper plating layer 143b include Sn in order to improve the mountability. However, the first upper plating layer 143a and the second upper plating layer 143b may include, for example, metal such as Cu, Ag, Pd, an Ag—Pd alloy, or Au, in addition to Sn.

The configurations of the first external electrode 14a and the second external electrode 14b are not limited to the configurations described above. For example, by directly plating the laminate 11, the first external electrode 14a and the second external electrode 14b may be formed by plating.

Figure 6A:
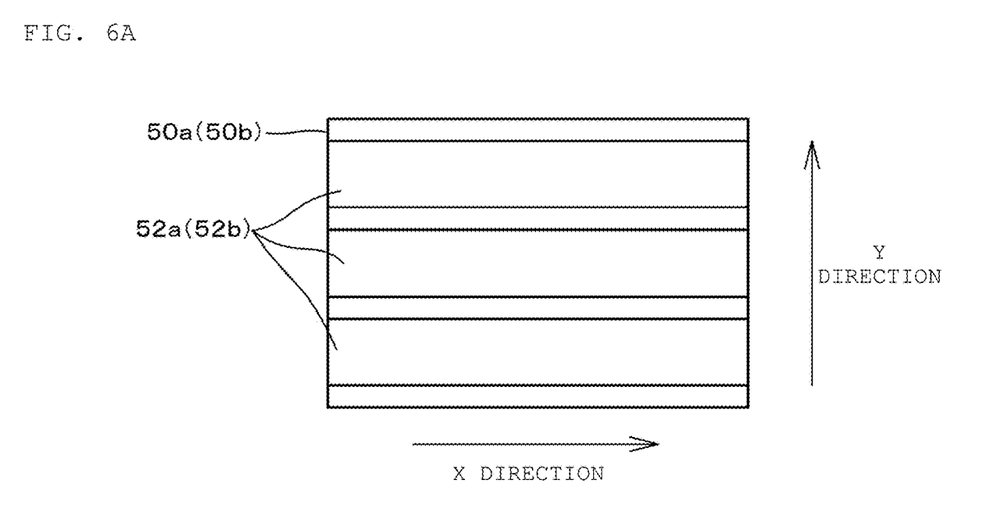
FIG. 6A is a schematic view for illustrating a ceramic green sheet on which conductive films are provided.
Figure 6B:
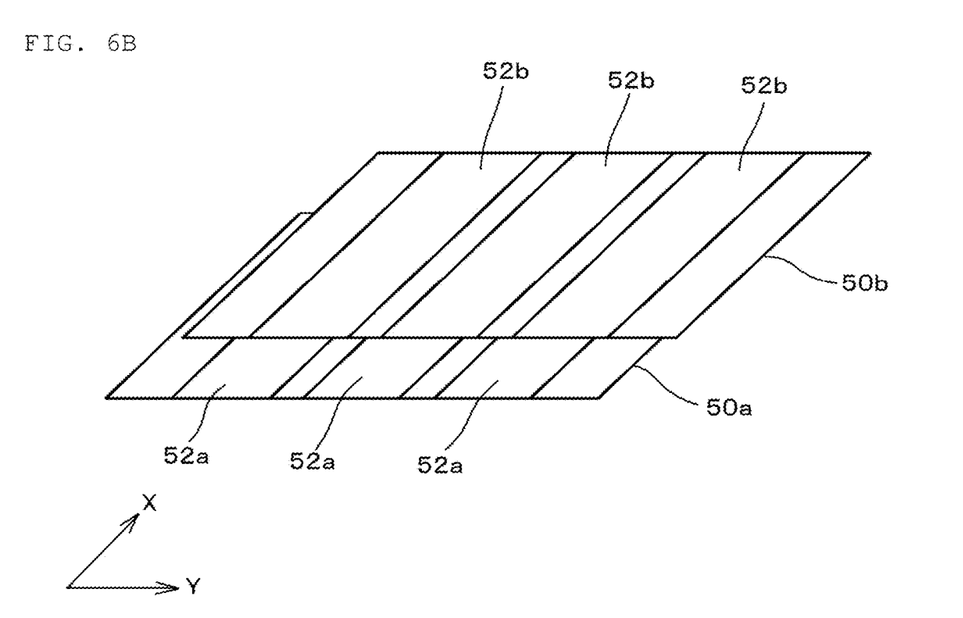
FIG. 6B is a schematic view for illustrating a state in which the ceramic green sheets on which the conductive films are provided are being laminated.
Figure 7:
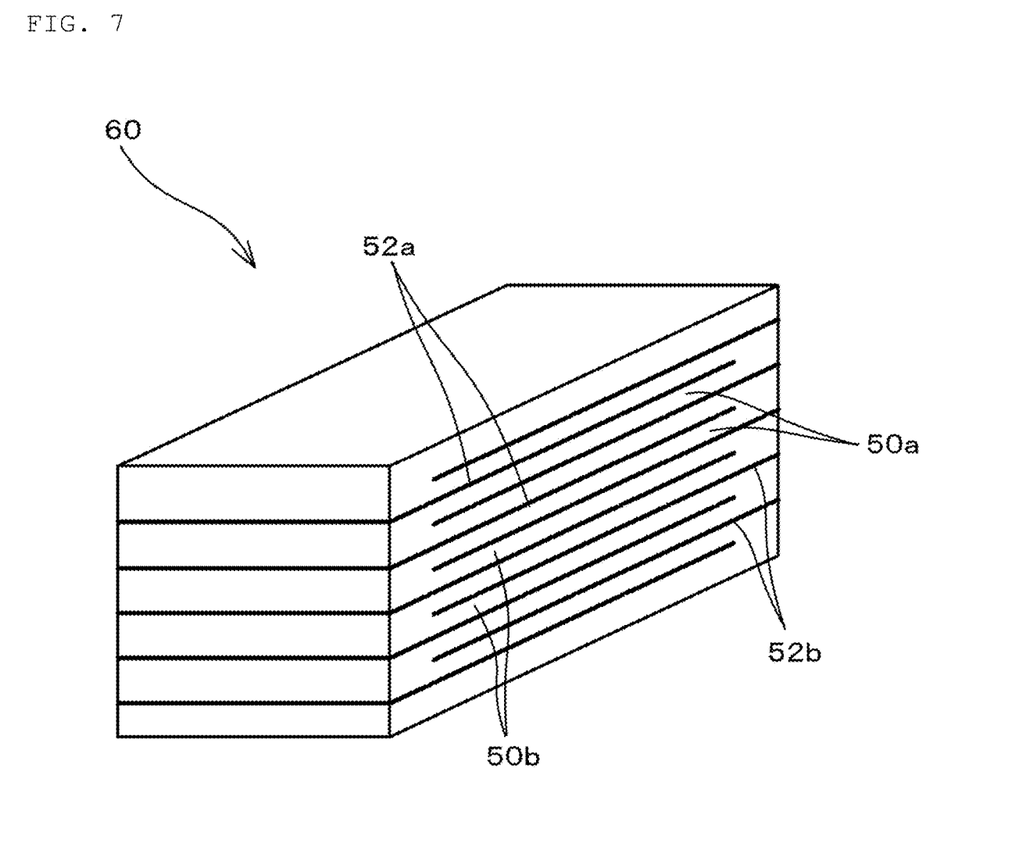
FIG. 7 is a perspective view for illustrating an example of the appearance of a laminate chip prepared in the middle of the manufacture of the multilayer ceramic capacitor 10.

Hereinafter, an example of a method of manufacturing the multilayer ceramic capacitor 10 which has the structure described above is described. FIGS. 6A and 6B are views for explaining an example of the method of manufacturing the multilayer ceramic capacitor 10 according to the present preferred embodiment, in which FIG. 6A is a schematic view for illustrating a ceramic green sheet on which conductive films are formed, and FIG. 6B is a schematic view for illustrating a state in which the ceramic green sheets on which conductive films are formed are being laminated. FIG. 7 is a perspective view for illustrating an example of the appearance of a laminate chip prepared in the middle of the manufacture of the multilayer ceramic capacitor 10.

First, a perovskite type compound including Ba and Ti is prepared as a dielectric material. A ceramic slurry is prepared by mixing, as additives, Si and Mg, and an organic binder, an organic solvent, a plasticizer, and a dispersant in a predetermined ratio with dielectric powder obtained from the dielectric material.

Then, ceramic green sheets 50a and 50b are prepared by applying the prepared ceramic slurry on the surfaces of a plurality of resin films (not shown). The ceramic green sheets 50b are alternately laminated with the ceramic green sheets 50a. The ceramic green sheets 50a and 50b can be prepared, for example, using a die coater, a gravure coater, a microgravure coater, or the like.

Next, as illustrated in FIG. 6A, conductive paste for internal electrodes is printed in stripes on the surfaces of the ceramic green sheets 50a and 50b, and dried. The conductive paste for internal electrodes includes, for example, Ni. Here, the direction in which the conductive paste for internal electrodes extends in stripes is defined as an X direction, and the direction perpendicular or substantially perpendicular to the X direction on the ceramic green sheet is defined as a Y direction. Thus, conductive films 52a (52b) to be the first internal electrodes 13a (second internal electrodes 13b) are formed. As the printing method, various methods such as screen printing, ink jet printing, and gravure printing can be used.

Next, the prepared ceramic green sheets are laminated. Specifically, after a predetermined number of ceramic green sheets on which conductive films are not formed to be the outer layer portion 22 are laminated, the plurality of ceramic green sheets 50a and 50b on which the conductive films 52a and 52b are formed are laminated while being mutually shifted in the Y direction, as illustrated in FIG. 6B. Then, a predetermined number of ceramic green sheets on which conductive films are not formed to be the outer layer portion 22 are laminated thereon to obtain a mother laminate.

Subsequently, the mother laminate is pressed by a method such as rigid press or isostatic press. Then, the pressed mother laminate is cut into a chip shape, so that a laminate chip 60 illustrated in FIG. 7 is obtained.

As illustrated in FIG. 7, only the conductive films 52a of the ceramic green sheets 50a are exposed at one end surface of the laminate chip 60, and only the conductive films 52b of the ceramic green sheets 50b are exposed at the other end surface. Further, on both side surfaces of the laminate chip 60, the conductive films 52a of the ceramic green sheets 50a and the conductive films 52b of the ceramic green sheets 50b are exposed.

Subsequently, ceramic green sheets for side margin portions to be the side margin portions 23 are prepared. A perovskite type compound including Ba and Ti is prepared as a dielectric material for preparing a ceramic green sheet for a side margin portion. A ceramic slurry is prepared by mixing an additive including Si and Mg, an organic binder, an organic solvent, a plasticizer, and a dispersant in a predetermined ratio with dielectric powder obtained from the dielectric material. Then, using the prepared ceramic slurry, a ceramic green sheet for forming the outer side margin layer 23a and a ceramic green sheet for forming the inner side margin layer 23b are prepared.

Here, when the ceramic slurry is to be prepared, the amount of Mg included in the additive is adjusted so that the molar ratio of Mg to Ti included in the side margin portion 23 after firing is smaller than the molar ratio of Mg to Ti included in the dielectric layer 12 after firing. Further, the ceramic slurry is applied so that the thickness of the ceramic green sheet for forming the outer side margin layer 23a is larger than the thickness of the ceramic green sheet for forming the inner side margin layer 23b.

Subsequently, the ceramic green sheet for an inner side margin layer is laminated and bonded onto the ceramic green sheet for an outer side margin layer to obtain a ceramic green sheet for a side margin portion having a two-layer structure.

Subsequently, of the ceramic green sheets for a side margin portion, the ceramic green sheet for an inner side margin layer and the side surface of the laminate chip 60 to which the conductive films 52a and 52b are exposed are arranged so as to face each other, and pressing and punching are preformed, to form a layer to be the side margin portion 23. A layer to be the side margin portion 23 is formed on the side surface on the opposite side by the same method.

Subsequently, barrel polishing of the laminate chip on which the layer to be the side margin portion 23 is formed is performed. Then, the laminate chip is subjected to degreasing treatment under a predetermined condition in a nitrogen atmosphere, and then firing treatment is performed at a predetermined temperature in a nitrogen-hydrogen-steam mixed atmosphere. With this, a sintered laminate is obtained.

Next, external electrode paste including Cu as a main component is applied and baked on each end surface of the sintered laminate to form the first base electrode layer 141a connected to the first internal electrodes 13a and the second base electrode layer 141b connected to the second internal electrodes 13b. Subsequently, the first lower plating layer 142a is formed by Ni plating on the surface of the first base electrode layer 141a, and the first upper plating layer 143a is formed by Sn plating on the surface of the first lower plating layer 142a. In this manner, the first external electrode 14a is formed. The second external electrode 14b is formed by the same method.

However, the laminate chip and the external electrode paste may be fired at the same time.

The multilayer ceramic capacitor 10 is prepared by the method described above. However, the manufacturing method described above is an example, and the method of manufacturing multilayer ceramic capacitor 10 is not limited to the manufacturing method described above.

The reliability of the insulation resistance was examined by changing the amount of Mg included in the dielectric layers 12 and the side margin portions 23 of the multilayer ceramic capacitor 10. Specifically, a test was conducted to investigate the reliability of the insulation resistance by changing the molar ratio of Mg to Ti included in the dielectric layer 12 and the molar ratio of Mg to Ti included in the side margin portion 23. The test results are shown in Table 1.

TABLE 1

| Sample Number | Inner Layer Portion Mg Amount (Molar Ratio Ti) | Side Margin Portion Mg Amount (Molar Ratio Ti) | Reliability |
| --- | --- | --- | --- |
| 1 | 0.04 | 0.02 | ◯ |
| 2 | 0.4 | 0.2 | ◯ |
| 3 | 1.0 | 0.5 | ◯ |
| 4 | 2.3 | 0.8 | ◯ |
| 5 | 3.5 | 0.8 | Δ |
| 6* | 1.0 | 1.0 | X |

The samples with sample numbers 1 to 5 shown in Table 1 are samples that are examples of preferred embodiments of the present invention that the molar ratio of Mg to Ti included in the side margin portion 23 is smaller than the molar ratio of Mg to Ti included in the dielectric layer 12. On the other hand, the sample with a sample number 6 in which ★ is marked on the sample number is a sample which is not within the scope of the present invention described above. In Table 1, the reliability of the insulation resistance was evaluated by three steps of "◯", "Δ", "x". "◯" indicates that the reliability of the insulation resistance is high, "Δ" indicates that the reliability of the insulation resistance is medium, and "x" indicates that the reliability of the insulation resistance is low. As a product, there is no problem if the reliability of the insulation resistance is "◯" or "Δ", and "◯" is more preferable.

As shown in Table 1, the samples with the sample numbers 1 to 5 which meet the requirement of the present invention had the reliability of the insulation resistance of "◯" or "Δ", but the sample with the sample number 6 which does not meet the requirement of the present invention had the reliability of the insulation resistance of "x". That is, examples of multilayer ceramic capacitors according to preferred embodiments of the present invention achieve more reliable insulation resistance than the multilayer ceramic capacitor that is not within the scope of the present invention.

Further, among the samples of the sample numbers 1 to that are examples of preferred embodiments of the present invention, the samples with sample numbers 1 to 4 in which the molar ratio of Mg to Ti included in the side margin portion 23 is about 0.02 or more and about 0.8 or less, and the molar ratio of Mg to Ti included in the dielectric layer 12 is about 0.04 or more and about 2.3 or less had the reliability of the insulation resistance of "○", and exhibited more preferable results. Therefore, among the multilayer ceramic capacitors that are examples of preferred embodiments of the present invention, the multilayer ceramic capacitor which meets the requirement that the molar ratio of Mg to Ti included in the side margin portion 23 is about 0.02 or more and about 0.8 or less, and the molar ratio of Mg to Ti included in the dielectric layer 12 is about 0.04 or more and about 2.3 or less had more reliable insulation resistance, and is preferable.

Preferred embodiments of the present invention is not limited to the preferred embodiment described above, and various applications and modifications can be made within the scope of the present invention.

For example, although the side margin portion 23 is described as including the two side margin layers 23a and 23b laminated in the width direction W in a preferred embodiment of the present invention described above, the side margin portion 23 may be configured by one side margin layer or may include three or more side margin layers. When the side margin portion 23 includes two or more side margin layers, it is preferable that the molar ratio of Mg to Ti included in the side margin layer located on the innermost side in the width direction W is set smaller than the molar ratio of Mg to Ti included in the side margin layer located on the outermost side in the width direction W.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. An electronic component, comprising:
   a laminate including a plurality of internal electrodes alternately laminated in a lamination direction with dielectric layers interposed between the plurality of internal electrodes, the laminate including:
      a first main surface and a second main surface opposite to each other in the lamination direction;
      a first side surface and a second side surface opposite to each other in a width direction perpendicular or substantially perpendicular to the lamination direction; and
      a first end surface and a second end surface opposite to each other in a length direction perpendicular or substantially perpendicular to the lamination direction and the width direction; and
   external electrodes provided on surfaces of the laminate and electrically connected to the internal electrodes; wherein
   the plurality of internal electrodes include a first internal electrode located closest to the first main surface in the lamination direction and a second internal electrode located closest to the second main surface in the lamination direction;
   the dielectric layers include dielectric layers interposed between the first internal electrode and the second internal electrode; and
   all of the dielectric layers interposed between the first internal electrode and the second internal electrode include Ti and Mg;
   when a cross section including the length direction and the width direction of the laminate is viewed from the lamination direction, side margin portions each include a dielectric including Ti and Mg, each of the side margin portions being a region in which the plurality of the internal electrodes do not exist; and
   a molar ratio of Mg to Ti included in the side margin portions is smaller than a molar ratio of Mg to Ti included in the dielectric layers.

2. The electronic component according to claim 1, wherein
   the molar ratio of Mg to Ti included in the side margin portions is about 0.02 or more and about 0.8 or less; and
   the molar ratio of Mg to Ti included in the dielectric layers is about 0.04 or more and about 2.3 or less.

3. The electronic component according to claim 1, wherein
   each of the side margin portions includes a plurality of side margin layers laminated in the width direction; and
   a molar ratio of Mg to Ti included in the side margin layer located on an innermost side in the width direction is smaller than a molar ratio of Mg to Ti included in the side margin layer located on an outermost side in the width direction.

4. The electronic component according to claim 1, wherein each of the plurality of internal electrodes includes a segregated portion in which Mg is segregated in a range of about 10 μm or less inward from an end portion in the width direction.

5. The electronic component according to claim 1, wherein an average thickness of the end portion in the width direction of each of the plurality of internal electrodes is smaller than an average thickness of a central portion in the width direction of each of the plurality of internal electrodes.

6. The electronic component according to claim 1, wherein the electronic component is one of a multilayer ceramic capacitor, an inductor, or an LC filter.

7. The electronic component according to claim 1, wherein the electronic component has a rectangular or substantially rectangular parallelepiped shape.

8. The electronic component according to claim 1, wherein a size of the electronic component is about 0.2 mm to about 3.2 mm inclusive in the length direction, about 0.1 mm to about 1.6 mm in the width direction, and about 0.1 mm to about 1.6 mm inclusive in the lamination direction.

9. The electronic component according to claim 1, wherein the laminate includes at least one of rounded corner portions or ridge line portions.

10. The electronic component according to claim 1, wherein each of the plurality of dielectric layers includes Ba.

11. The electronic component according to claim 1, wherein each of the plurality of dielectric layers includes dielectric ceramic particles having a perovskite structure.

12. The electronic component according to claim 1, wherein each of the plurality of dielectric layers includes Si.

13. The electronic component according to claim 1, wherein each of the plurality of dielectric layers includes at least one of Dy, Y or Ho.

14. The electronic component according to claim 1, wherein each of the plurality of dielectric layers includes Ba.

15. The electronic component according to claim 1, wherein each of the plurality of internal electrodes includes Ni.

16. The electronic component according to claim 1, wherein each of the plurality of internal electrodes includes a segregated portion in which Mg is segregated at an end surface in the width direction.

17. The electronic component according to claim 1, wherein in each of the plurality of internal electrodes, a thickness of an end portion in the width direction is less than a thickness of a central portion in the width direction.

18. The electronic component according to claim 17, wherein the thickness of the central portion is about 0.8 μm and a thickness of the end portion is about 0.55 μm.

19. The electronic component according to claim 17, wherein a thin portion that is thinner than the thickness of the end portion is provided within about 10 μm from the end portion in the width direction.

20. The electronic component according to claim 1, wherein dimensions in the width direction of each of the plurality of internal electrodes are the same or substantially the same.

* * * * *